US012638063B2

(12) United States Patent (10) Patent No.: US 12,638,063 B2
Watanabe (45) Date of Patent: May 26, 2026

(54) DAMPER DEVICE

(71) Applicant: AISIN CORPORATION, Kariya (JP)

(72) Inventor: Taiki Watanabe, Echizen (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/848,770

(22) PCT Filed: Jun. 16, 2023

(86) PCT No.: PCT/JP2023/022462
§ 371 (c)(1),
(2) Date: Sep. 19, 2024

(87) PCT Pub. No.: WO2024/009735
PCT Pub. Date: Jan. 11, 2024

(65) Prior Publication Data
US 2025/0224005 A1 Jul. 10, 2025

(30) Foreign Application Priority Data
Jul. 4, 2022 (JP) ................................. 2022-107532

(51) Int. Cl.
*F16F 15/123* (2006.01)
*F16D 3/12* (2006.01)

(52) U.S. Cl.
CPC .......... *F16F 15/12326* (2013.01); *F16D 3/12* (2013.01); *F16F 15/1232* (2013.01); *F16D 2300/22* (2013.01)

(58) Field of Classification Search
CPC ......................... F16F 15/123–15/12393; F16F 15/134–15/13492; F16D 3/12; F16D 13/64; F16D 2300/22
USPC ....................................... 192/205; 464/68.92
See application file for complete search history.

(56) References Cited

U.S. PATENT DOCUMENTS

2016/0201729 A1* 7/2016 Uehara ............. F16F 15/12326
464/68.92
2017/0276211 A1* 9/2017 Osumi ............. F16F 15/12326

FOREIGN PATENT DOCUMENTS

JP 2017061964 A * 3/2017 ............. F16D 13/64
JP 2019-157964 A 9/2019

* cited by examiner

*Primary Examiner* — Richard M Lorence
(74) *Attorney, Agent, or Firm* — Oliff PLC

(57) ABSTRACT

A damper device that includes: a first rotator; an intermediate member; a first seat; a second seat; a first elastic body; a third seat, a fourth seat, a second elastic body and a second rotator that includes a first support portion that supports the second seat and a second support portion that supports the fourth seat, and is provided so as to be rotatable about the rotation axis relative to the first rotator and the intermediate member.

8 Claims, 7 Drawing Sheets

DAMPER DEVICE

TECHNICAL FIELD

The technology disclosed in the present application relates to a damper device that absorbs variations in torque transmitted between a first rotator and a second rotator.

BACKGROUND ART

Conventionally, there has been known a damper device that absorbs variations in torque transmitted between a first rotator (disc plate) and a second rotator (hub).

In a damper device disclosed in Patent Document 1, a seat that rotates by receiving a centrifugal force abuts against a protrusion on a hub, and further rotation is suppressed. The entire contents of Patent Document 1 are incorporated herein by reference.

RELATED ART DOCUMENTS

Patent Documents

Patent Document 1: Japanese Unexamined Patent Application Publication No. 2019-157964 (JP 2019-157964 A)

SUMMARY OF THE DISCLOSURE

Problem to be Solved by the Disclosure

In the damper device disclosed in Patent Document 1, however, when the area of contact and sliding between the seat that rotates by receiving the centrifugal force and the hub is not secured sufficiently, there is a possibility that the seat and the hub are worn due to such sliding.

Therefore, various embodiments disclosed in the present application provide a vibration damping device that at least partially reduces wear between a seat and a member that supports the seat due to sliding against each other.

Means for Solving the Problem

A damper device according to one aspect can adopt a configuration in which "the damper device includes: a first rotator that includes a housing area extending in a circumferential direction and is configured to rotate about a rotation axis; an intermediate member that includes a common support portion housed in the housing area and is provided so as to be rotatable about the rotation axis relative to the first rotator; a first seat housed in the housing area and supported by the common support portion; a second seat housed in the housing area and supported by a first end face surrounding one end of the housing area; a first elastic body interposed between the first seat and the second seat; a third seat housed in the housing area and supported by the common support portion, the third seat being disposed such that the common support portion is interposed between the first seat and the third seat; a fourth seat housed in the housing area and supported by a second end face surrounding the other end of the housing area; a second elastic body interposed between the third seat and the fourth seat; and a second rotator that includes a first support portion that supports the second seat and a second support portion that supports the fourth seat, and is provided so as to be rotatable about the rotation axis relative to the first rotator and the intermediate member, in which at least one target seat out of the first seat, the second seat, the third seat, and the fourth seat is configured to rotate about a fulcrum that is a point at which the at least one target seat abuts against a mating member that supports the at least one target seat so that a second contact surface spaced away from the fulcrum by a second radius larger than a first radius and having a cross section extending in an arc shape slides against a first contact surface of the mating member spaced away from the fulcrum by the first radius and having a cross section extending in an arc shape." The configuration can be adopted.

The various embodiments disclosed in the present application can provide the vibration damping device that at least partially reduces the wear between the seat and the member that supports the seat due to the sliding against each other.

BRIEF DESCRIPTION OF THE DRAWINGS

FIG. 5A is an enlarged view schematically showing another example of the configuration of the portion including the third seat 434 in the damper device 10 shown in FIG. 2.

FIG. 5B is an enlarged view schematically showing still another example of the configuration of the portion including the third seat 434 in the damper device 10 shown in FIG. 2.

MODES FOR CARRYING OUT THE DISCLOSURE

Various embodiments will be described below with reference to the accompanying drawings. Constituent elements that are common to the drawings are denoted by the same reference signs. It should be noted that a constituent element that appears in a certain drawing may be omitted in another drawing for convenience of description. It should also be noted that the accompanying drawings are not necessarily provided on the accurate scales.

1. Configuration of Damper Device

Figure 1:
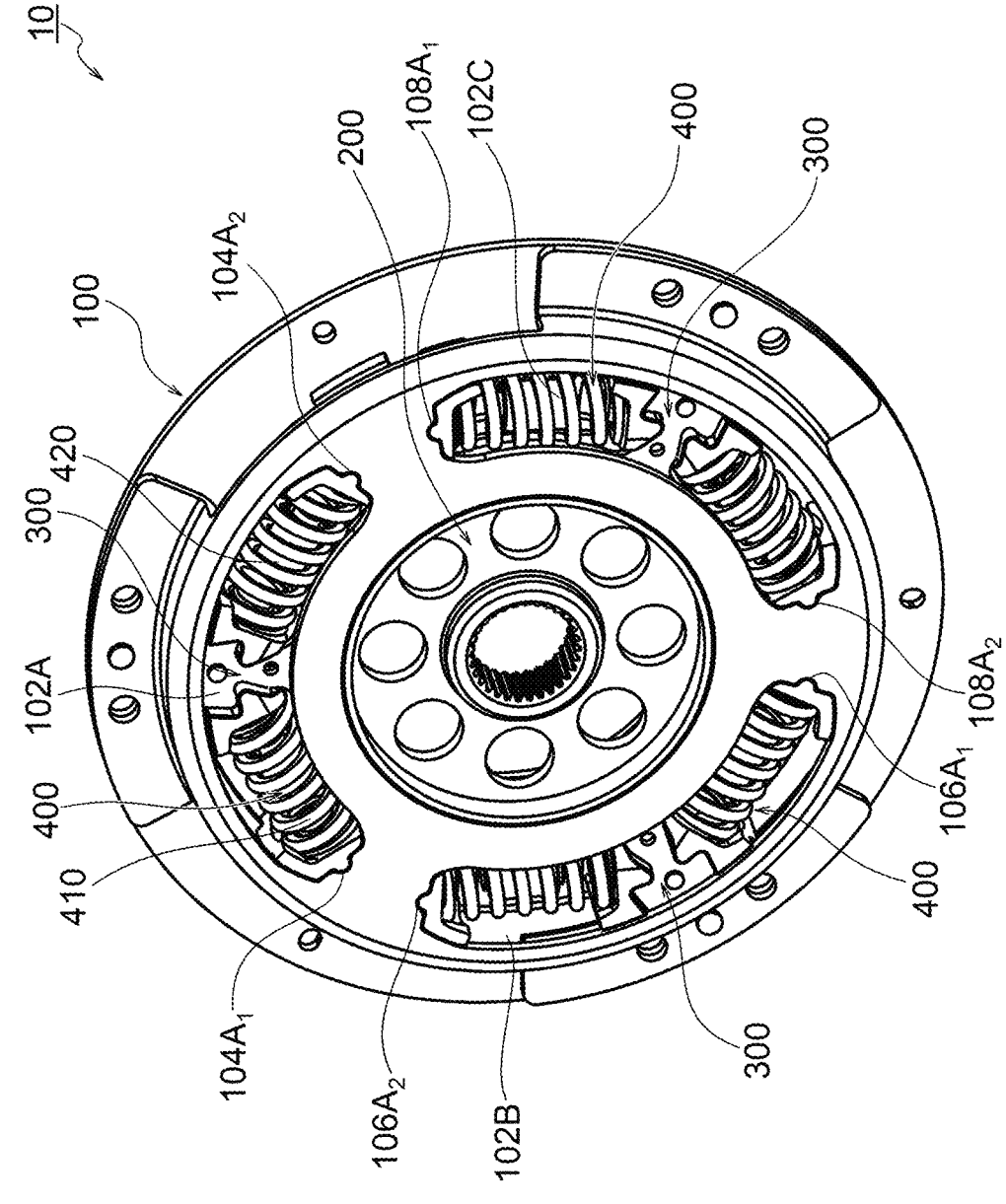
FIG. 1 is a schematic diagram showing an overview of a vibration damping device according to an embodiment.
Figure 2:
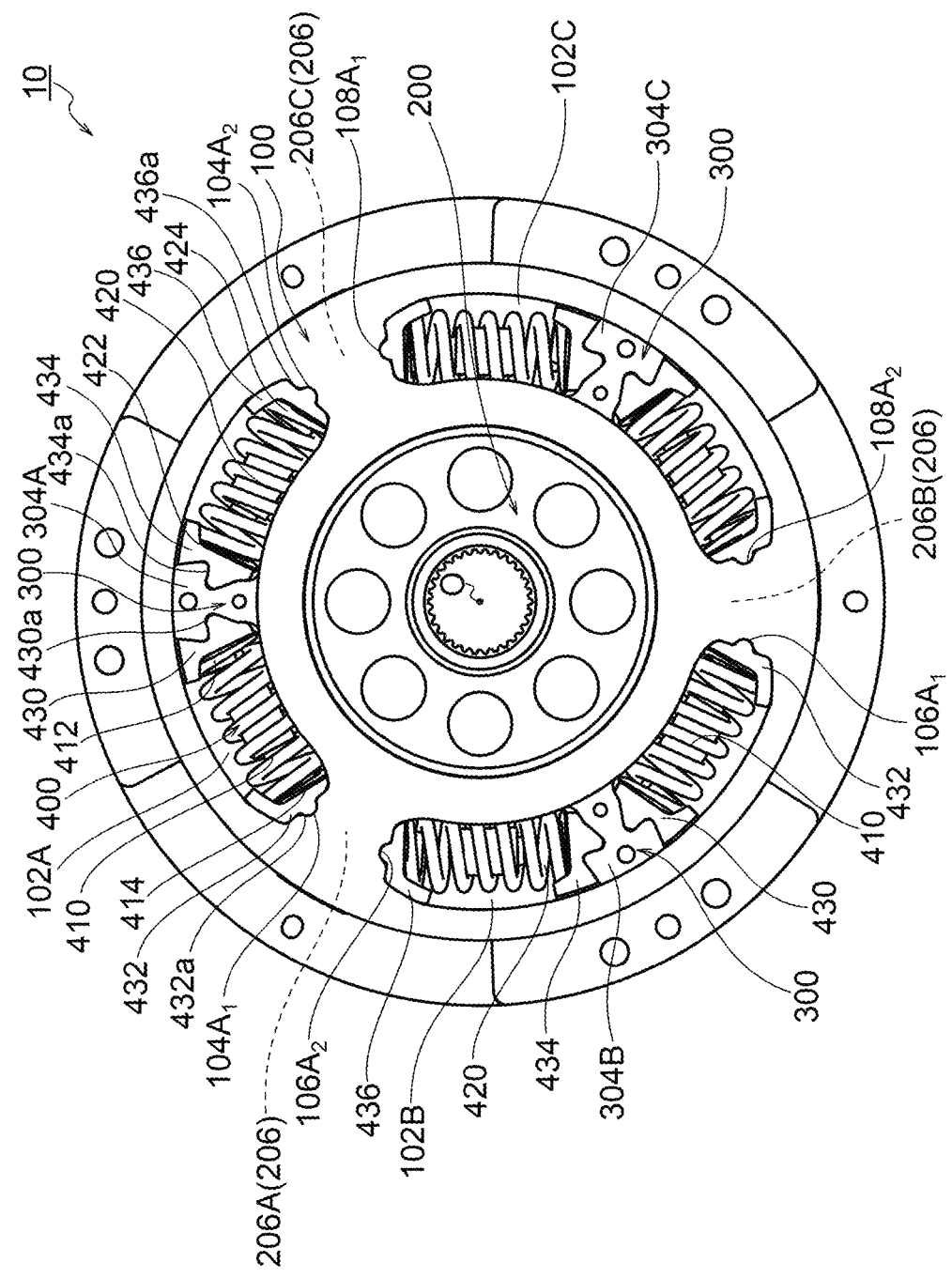
FIG. 2 is a top view showing the configuration of a damper device shown in FIG. 1.
Figure 3:
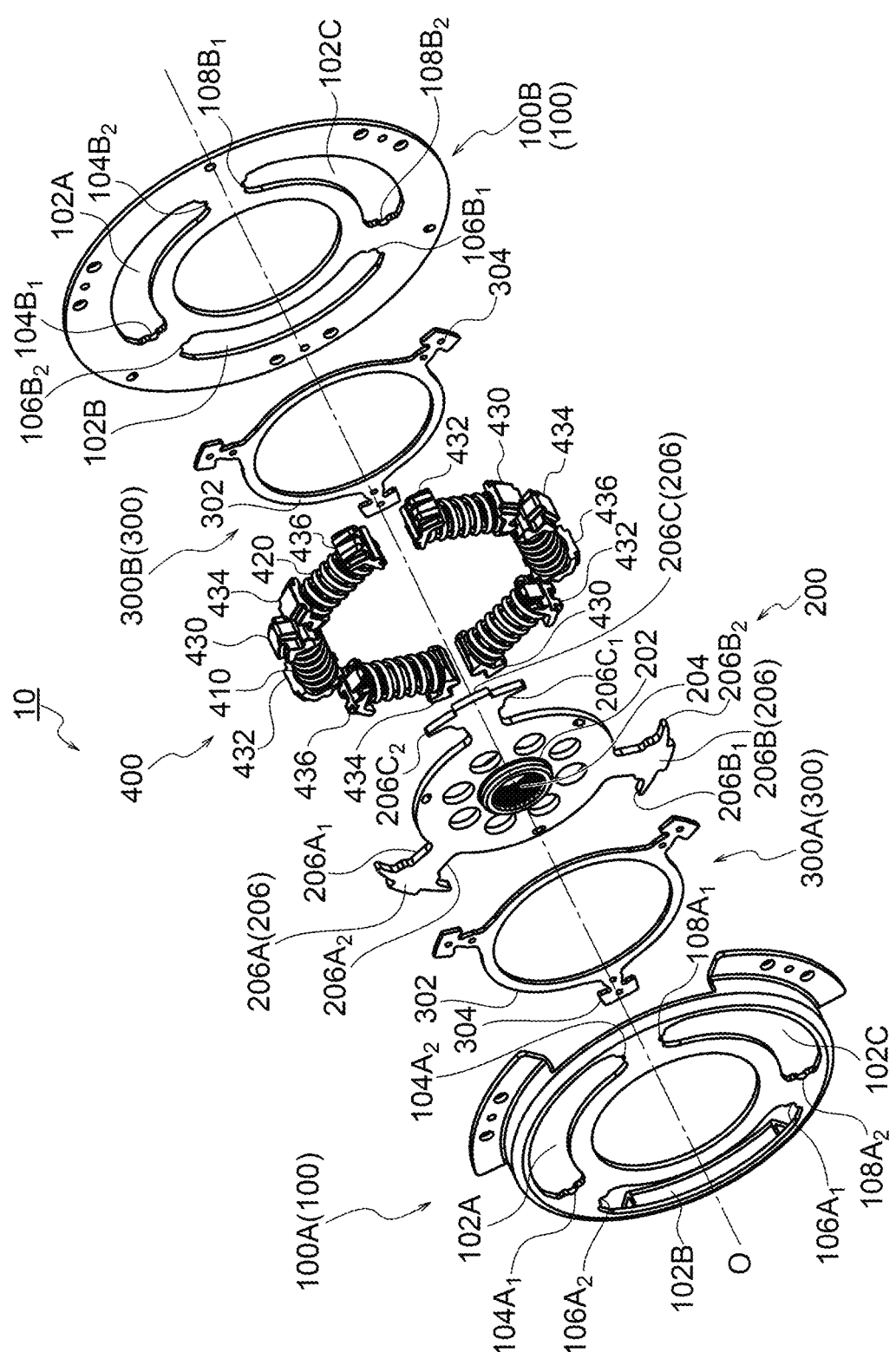
FIG. 3 is an exploded perspective view showing the configuration of the damper device shown in FIG. 1.

An overview of the configuration of a damper device according to one embodiment will be described with reference to FIGS. 1 to 3. FIG. 1 is a perspective view schematically showing an example of the configuration of the damper device according to the embodiment. FIG. 2 is a top view showing the configuration of the damper device shown in FIG. 1. FIG. 3 is an exploded perspective view showing the configuration of the damper device shown in FIG. 1.

A damper device 10 according to the embodiment can transmit a driving force from a driving source such as an engine or a motor to a transmission by, for example, being clamped between a flywheel (not shown) and a pressure plate (not shown). The structure for clamping the damper device 10 between the flywheel and the pressure plate is well known, and therefore detailed description thereof will be omitted.

The damper device 10 can absorb and damp vibrations in a torsional direction. As shown in FIGS. 1 to 3, the damper device 10 can include disc plates 100 serving as a first rotator, a hub 200 serving as a second rotator, intermediate members 300, and elastic mechanism units 400 each including a first elastic body 410 and a second elastic body 420.

1-1. Hub 200

The hub 200 may be disposed on an output side of a power transmission path. The hub 200 may be made of, for example, a metal material, may have a shape extending like a substantial ring as a whole, and may be provided so as to be rotatable about a rotation axis O. As best shown in FIG. 3, an input shaft (not shown) of the transmission (not shown) is inserted through a through hole 204 formed in a substantially annular cylindrical portion 202. Thus, the hub 200 can be splined to the input shaft.

The hub 200 can also include a plurality of flanges 206 extending in a radial direction from the cylindrical portion 202. For example, as described later, the hub 200 can include a total of three flanges 206 (206A, 206B, 206C) so that, in association with the fact that the disc plates 100 include three housing areas 102 (102A, 102B, 102C), a total of two flanges 206 are positioned at both ends of each housing area.

Focusing on the housing area 102A of the disc plates 100, as shown in FIG. 3, a cutout 206A$_1$ may be formed on one side (right side on the drawing sheet) of the flange 206A. The cutout 206A$_1$ can support a second seat 432 of the elastic mechanism unit 400 housed in the housing area 102A from a circumferentially outer side. The cutout 206A$_1$ can function as a "first support portion" for the housing area 102A.

A cutout 206C$_2$ may be formed on the other side (upper side on the drawing sheet) of the flange 206C. The cutout 206C$_2$ can support a fourth seat 436 of the elastic mechanism unit 400 housed in the housing area 102A from a circumferentially outer side. The cutout 206C$_2$ can function as a "second support portion" for the housing area 102A.

Focusing on the housing area 102B of the disc plates 100, as shown in FIG. 3, a cutout 206B$_1$ may be formed on one side (upper side on the drawing sheet) of the flange 206B. The cutout 206B$_1$ can support a second seat 432 of the elastic mechanism unit 400 housed in the housing area 102B from a circumferentially outer side. The cutout 206B$_1$ can function as a "first support portion" for the housing area 102B.

A cutout 206A$_2$ may be formed on the other side (left side on the drawing sheet) of the flange 206A. The cutout 206A$_2$ can support a fourth seat 436 of the elastic mechanism unit 400 housed in the housing area 102B from a circumferentially outer side. The cutout 206A$_2$ can function as a "second support portion" for the housing area 102B.

Focusing on the housing area 102C of the disc plates 100, as shown in FIG. 3, a cutout 206C$_1$ may be formed on one side (lower side on the drawing sheet) of the flange 206C. The cutout 206C$_1$ can support a second seat 432 of the elastic mechanism unit 400 housed in the housing area 102C from a circumferentially outer side. The cutout 206C$_1$ can function as a "first support portion" for the housing area 102C.

A cutout 206B$_2$ may be formed on the other side (lower side on the drawing sheet) of the flange 206B. The cutout 206B$_2$ can support a fourth seat 436 of the elastic mechanism unit 400 housed in the housing area 102C from a circumferentially outer side. The cutout 206B$_2$ can function as a "second support portion" for the housing area 102C.

1-2. Disc Plates 100

The disc plates 100 may be disposed on an input side of the power transmission path. The disc plates 100 may be made of, for example, a metal material. As best shown in FIG. 3, the disc plates may be provided with the hub 200, the intermediate members 300, and the elastic mechanism units 400 interposed therebetween so as to be rotatable about the central axis O relative to the hub 200 and the intermediate members 300.

The disc plates 100 can include a first disc plate 100A and a second disc plate 100B as a pair of members provided on both axial sides of the hub 200 and the intermediate members 300. The second disc plate 100B can have a substantially annular shape as a whole, and the first disc plate 100A can have a substantially cylindrical shape as a whole.

The first disc plate 100A and the second disc plate 100B may be joined near their outer peripheries with a plurality of rivets etc. The first disc plate 100A and the second disc plate 100B can cooperate with each other to form at least one housing area 102, for example, the three housing areas 102A, 102B, 102C. Each of the housing areas 102 can partially house one elastic mechanism unit 400 (expose part of one elastic mechanism unit 400 to the outside). To form such housing areas 102, the first disc plate 100A and the second disc plate 100B can include openings in portions corresponding to the housing areas as best shown in FIG. 3.

The disc plates 100 can house the elastic mechanism units 400 in the housing areas 102. Specifically, as shown in FIGS. 1 to 3, the disc plates 100 can house, in the housing area 102A, one elastic mechanism unit 400, namely, the first elastic body 410, a first seat 430 and the second seat 432 disposed on both sides of the first elastic body 410, the second elastic body 420, and a third seat 434 and the fourth seat 436 disposed on both sides of the second elastic body 420.

Similarly, the disc plates 100 can house the above one elastic mechanism unit 400 (the first elastic body 410, the first seat 430 and the second seat 432 disposed on both sides of the first elastic body 410, the second elastic body 420, and the third seat 434 and the fourth seat 436 disposed on both sides of the second elastic body 420) in each of the housing areas 102B and 102C.

The disc plates 100 can support two seats included in the elastic mechanism unit 400 housed in each housing area 102. First, focus is put on the housing area 102A. Referring to FIGS. 1 and 3, a first end face 104A$_1$ surrounding one end of the housing area 102A (opening) in the first disc plate 100A can support the second seat 432 by abutting against the second seat 432 from the circumferentially outer side. Similarly, a first end face 104B$_1$ surrounding one end of the housing area 102A (opening) in the second disc plate 100B can support the second seat 432 by abutting against the second seat 432 from the circumferentially outer side.

A second end face 104A$_2$ surrounding the other end of the housing area 102A (opening) in the first disc plate 100A can support the fourth seat 436 by abutting against the fourth seat 436 from the circumferentially outer side. Similarly, a second end face 104B$_2$ surrounding the other end of the housing area 102A (opening) in the second disc plate 100B can support the fourth seat 436 by abutting against the fourth seat 436 from the circumferentially outer side.

Next, focus is put on the housing area 102B. Referring to FIGS. 1 and 3, a first end face 106A$_1$ surrounding one end of the housing area 102B (opening) in the first disc plate 100A can support the second seat 432 by abutting against the second seat 432 from the circumferentially outer side. Similarly, a first end face 106B$_1$ surrounding one end of the housing area 102B (opening) in the second disc plate 100B can support the second seat 432 by abutting against the second seat 432 from the circumferentially outer side.

A second end face 106A$_2$ surrounding the other end of the housing area 102B (opening) in the first disc plate 100A can support the fourth seat 436 by abutting against the fourth seat 436 from the circumferentially outer side. Similarly, a second end face 106B$_2$ surrounding the other end of the housing area 102B (opening) in the second disc plate 100B can support the fourth seat 436 by abutting against the fourth seat 436 from the circumferentially outer side.

Next, focus is put on the housing area 102C. Referring to FIGS. 1 and 3, a first end face 108A$_1$ surrounding one end of the housing area 102C (opening) in the first disc plate 100A can support the second seat 432 by abutting against the second seat 432 from the circumferentially outer side. Similarly, a first end face 108B$_1$ surrounding one end of the housing area 102C (opening) in the second disc plate 100B can support the second seat 432 by abutting against the second seat 432 from the circumferentially outer side.

A second end face 108A$_2$ surrounding the other end of the housing area 102C (opening) in the first disc plate 100A can support the fourth seat 436 by abutting against the fourth seat 436 from the circumferentially outer side. Similarly, a second end face 108B$_2$ surrounding the other end of the housing area 102C (opening) in the second disc plate 100B can support the fourth seat 436 by abutting against the fourth seat 436 from the circumferentially outer side.

1-3. Intermediate Members 300

The intermediate members 300 may be made of, for example, a metal material or a resin material. As best shown in FIG. 3, the intermediate members 300 may be provided with the hub 200 interposed therebetween so as to be rotatable about the central axis O relative to the disc plates 100 and the hub 200.

The intermediate members 300 may include, for example, two annular members, namely, a first member 300A and a second member 300B having substantially the same shape. Each of the first member 300A and the second member 300B can include an annular member 302 and a plurality of flange portions 304 protruding in the radial direction from the annular member 302. In association with the fact that the disc plates 100 include the three housing areas 102, each of the first member 300A and the second member 300B can include three flange portions 304 as the plurality of flange portions 304.

The intermediate members 300 as a whole can be formed by joining the first member 300A and the second member 300B with rivets etc. with the hub 200 interposed therebetween and their flange portions 304 facing each other.

The three flange portions 304 included in the intermediate member 300 may each be provided in association with one housing area 102 out of the three housing areas 102. As best shown in FIG. 2, a first flange portion 304A may be provided in association with the housing area 102A. Similarly, a second flange portion 304B and a third flange portion 304C may be provided in association with the housing area 102B and the housing area 102C, respectively.

The first flange portion 304A is provided between the first seat 430 and the third seat 434 housed in the housing area 102A, and can function as a support portion (common support portion) that supports the first seat 430 and the third seat 434. Similarly, the second flange portion 304B (third flange portion 304C) is provided between the first seat 430 and the third seat 434 housed in the housing area 102B (housing area 103C), and can function as a support portion (common support portion) that supports the first seat 430 and the third seat 434. The detailed configurations of the first flange portion 304A to the third flange portion 304C (the flange portion 304A to the third flange portion 304C may have the same configuration) will be described later.

1-4. Elastic Mechanism Units 400

As best shown in FIG. 2, one elastic mechanism unit 400 partially housed in each housing area 102 can include, as described above, the first elastic body 410, the first seat 430 and the second seat 432 that are disposed on both sides of the first elastic body 410 and support the first elastic body 400, the second elastic body 420, and the third seat 434 and the fourth seat 436 that are disposed on both sides of the second elastic body 420 and support the second elastic body 420.

The individual elastic mechanism units 400 housed in the plurality of housing areas 102 may typically have the same configuration. Therefore, focus is put only on the one elastic mechanism unit 400 housed in the housing area 102A. The configurations of the individual elastic mechanism units 400 housed in the housing area 102B and the housing area 102C may be identical to the configuration of the one elastic mechanism unit 400 housed in the housing area 102A.

The first elastic body 410 and the second elastic body 420 may each be made of a metal material and extend in a helical shape from one end to the other end.

Each of the first seat 430, the second seat 432, the third seat 434, and the fourth seat 436 may be made of, for example, a resin material or a metal material.

As clearly shown in FIG. 2, the first seat 430 may have a substantially L-shaped cross section as a whole. With this shape, the first seat 430 can abut against one end 412 of the first elastic body 410 and support the one end 412 from the circumferentially outer side and the radially outer side. The first seat 430 can further include, on the side opposite to the one end 412 of the first elastic body 410, an engagement portion 430a that engages with the first flange portion 304A of the intermediate member 300 and is supported by the first flange portion 304A. The detailed configuration of the engagement portion 430a (the shape symmetrical to that of an engagement portion 434a with respect to the first flange portion 304A) will be described later.

The second seat 432 may have a substantially L-shaped cross section as a whole. With this shape, the second seat 432 can abut against the other end 414 of the first elastic body 410 and support the other end 414 from the circumferentially outer side and the radially outer side. The second seat 432 can further include, on the side opposite to the other end 414 of the first elastic body 410, an engagement portion 432a that engages with the first end face 104A$_1$ (104B$_1$) of the disc plate 100 and is supported by the first end face 104A$_1$ (104B$_1$). Although illustration is omitted in FIG. 2, the engagement portion 432a may also be supported by the cutout 206A$_1$ (see FIG. 3) of the hub 200. The detailed configuration of the engagement portion 432a will be described later.

The third seat 434 may have a substantially L-shaped cross section as a whole. With this shape, the third seat 434 can abut against one end 422 of the second elastic body 420 and support the one end 422 from the circumferentially outer side and the radially outer side. The third seat 434 can further include, on the side opposite to the one end 422 of the second elastic body 420, the engagement portion 434a that engages with the first flange portion 304A of the intermediate member 300 and is supported by the first flange portion 304A. The detailed configuration of the engagement portion 434a will be described later. The third seat 434 may have a shape symmetrical to that of the first seat 430.

The fourth seat 436 may have a substantially L-shaped cross section as a whole. With this shape, the fourth seat 436 can abut against the other end 424 of the second elastic body 420 and support the other end 424 from the circumferentially outer side and the radially outer side. The fourth seat 436 can further include, on the side opposite to the other end 424 of the second elastic body 420, an engagement portion 436a that engages with the second end face 104$A_2$ (104$B_2$) of the disc plate 100 and is supported by the second end face 104$A_2$ (104$B_2$). Although illustration is omitted in FIG. 2, the engagement portion 436a may also be supported by the cutout 206$C_2$ (see FIG. 3) of the hub 200. The detailed configuration of the engagement portion 436a will be described later. The fourth seat 436 may have a shape symmetrical to that of the second seat 432.

2. Operation of Damper Device 10

Next, the operation of the damper device 10 having the above configuration will be described. FIGS. 1 and 3 show an initial state in which no driving force is transmitted to the damper device 10 from the driving source such as an engine or a motor, or a state in which no phase difference occurs between the disc plates 100 and the hub 200.

Power from the driving source such as an engine or a motor may be transmitted in the order of the disc plates 100, the second seat 432, the first elastic body 410, the first seat 430, the intermediate members 300, the third seat 434, the second elastic body 420, the fourth seat 436, and the hub 200. Focusing on the housing area 102A, the power is first transmitted from the first end face 104$A_1$ (104$B_1$) of the disc plate 100 to the second seat 432. The second seat 432 transmits the power to the first seat 430 while deflecting the first elastic body 410. The first seat 430 transmits the power to the first flange portion 304A of the intermediate member 300. The first flange portion 304A transmits the power to the fourth seat 436 while deflecting the second elastic body 420 via the third seat 434. Finally, the fourth seat 436 can transmit the power to the hub 200 via the cutout 206$C_2$ in the hub 200.

Similarly, in the housing area 102B, the power may be transmitted from the first end face 106$A_1$ (106$B_1$) of the disc plate 100 to the cutout 206$A_2$ of the hub 200 via the one elastic mechanism unit 400 disposed in the housing area 102B.

Similarly, in the housing area 102C, the power may be transmitted from the first end face 108$A_1$ (108$B_1$) of the disc plate 100 to the cutout 206$B_2$ of the hub 200 via the one elastic mechanism unit 400 disposed in the housing area 102C.

When the torque transmitted to the disc plate 100 is positive (e.g., during acceleration), the disc plate 100 can rotate counterclockwise on the drawing sheet relative to the hub 200 though illustration is omitted in FIGS. 1 and 3. Therefore, the fourth seat 436 is pushed toward the third seat 434 by the second end face 104$A_2$ (104$B_2$) and moves away from the cutout 206$C_2$ of the hub 200 and closer to the third seat 434 against the second elastic body 420. The first seat 430 moves closer to the second seat 432 against the first elastic body 410 by being pushed by the third seat 434 and the first flange portion 304A of the intermediate member 300. Since the hub 200 is relatively stationary, the second seat 432 supported in the cutout 206$A_1$ of the hub 200 does not slide. Therefore, the first elastic body 410 and the second elastic body 420 contract, and the first end face 104$A_1$ (104$B_1$) of the disc plate 100 terminates the support for the second seat 432 and moves away from the second seat 432.

Then, the first elastic body 410 and the second elastic body 420 extend back to their original shapes, and the second seat 432 biased by the first elastic body 410 pushes the cutout 206$A_1$ of the hub 200 counterclockwise on the drawing sheet. Thus, the hub 200 rotates counterclockwise and furthermore the input shaft of the transmission (not shown) rotates.

Such an operation is similarly performed in the individual elastic mechanism units 400 disposed in the housing area 102B and the housing area 102C.

When the torque transmitted to the disc plate 100 is negative (e.g., during deceleration by engine braking), the disc plate 100 can rotate clockwise on the drawing sheet relative to the hub 200 though illustration is omitted in FIGS. 1 and 3. Therefore, the second seat 432 is pushed toward the first seat 430 by the first end face 104$A_1$ (104$B_1$) and moves away from the cutout 206$A_1$ of the hub 200 and closer to the first seat 430 against the first elastic body 410. The third seat 434 moves closer to the fourth seat 436 against the second elastic body 420 by being pushed by the first seat 430 and the first flange portion 304A of the intermediate member 300. Since the hub 200 is relatively stationary, the fourth seat 436 supported in the cutout 206$C_2$ of the hub 200 does not slide. Therefore, the first elastic body 410 and the second elastic body 420 contract, and the second end face 104$A_2$ (104$B_2$) of the disc plate 100 terminates the support for the fourth seat 436 and moves away from the fourth seat 436.

Then, the first elastic body 410 and the second elastic body 420 extend back to their original shapes, and the fourth seat 436 biased by the second elastic body 420 pushes the cutout 206$C_2$ of the hub 200 clockwise on the drawing sheet. Thus, the hub 200 that rotates counterclockwise decelerates and furthermore the input shaft of the transmission (not shown) decelerates.

Such an operation is similarly performed in the individual elastic mechanism units 400 disposed in the housing area 102B and the housing area 102C.

3. Configurations and Operations of First Seat 430 and Third Seat 434 for Convenience of Description, Focus is First Put on the Third Seat 434.

Figure 4:
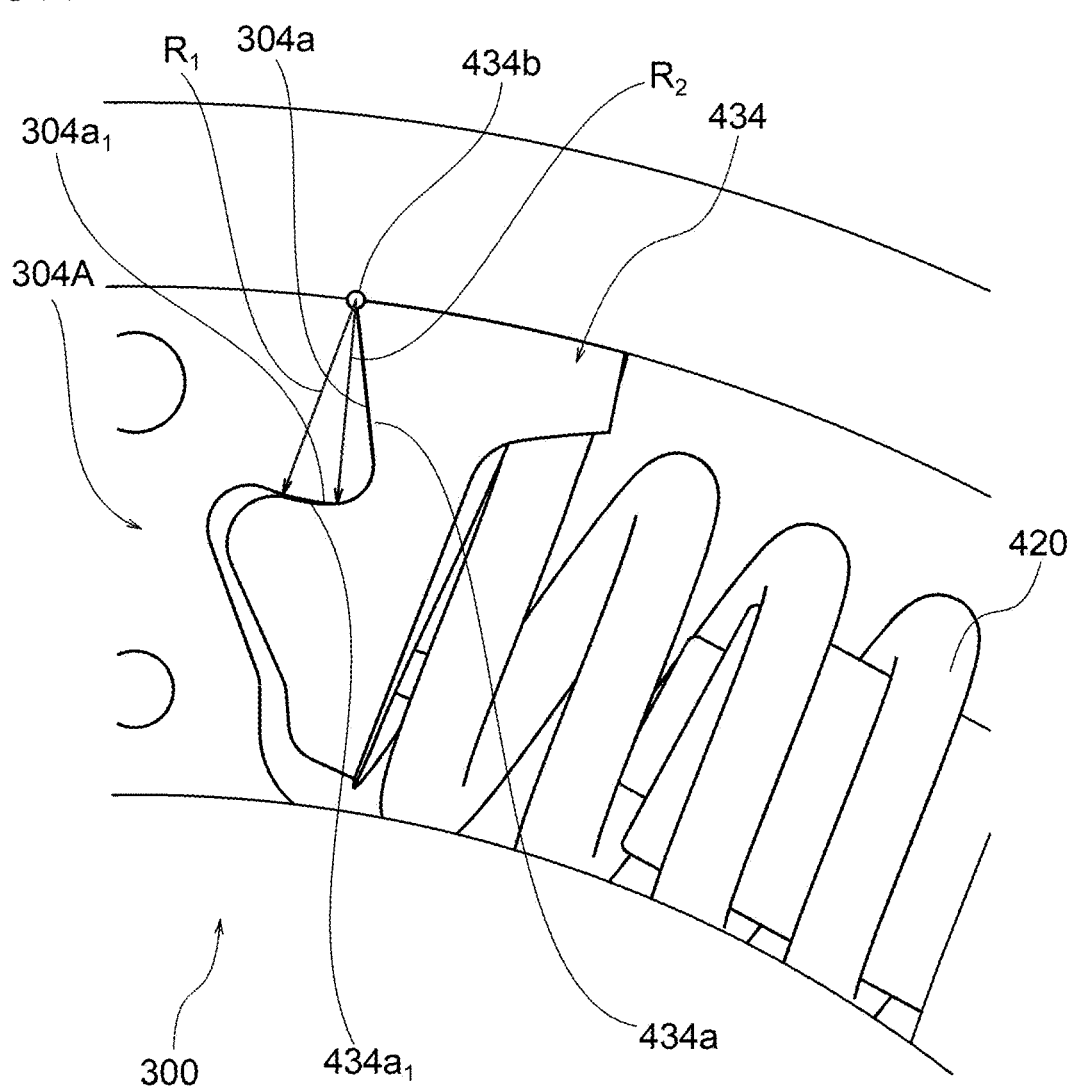
FIG. 4 is an enlarged view schematically showing the configuration of a portion including a third seat 434 in a damper device 10 shown in FIG. 2.

FIG. 4 is an enlarged view schematically showing the configuration of a portion including the third seat 434 in the damper device 10 shown in FIG. 2.

As shown in FIG. 4, the third seat 434 can include the engagement portion 434a on the side opposite to the second elastic body 420. The engagement portion 434a can have a substantially inverted S-shaped cross section. The third seat 434 can rotate about a fulcrum 434b that is a point at which the third seat 434 abuts against the first flange portion 304A of the intermediate member 300.

The engagement portion 434a can include a contact surface (second contact surface) 434$a_1$ spaced away from the fulcrum 434b by a radius (second radius) $R_2$ and having a cross section extending in an arc shape. The radius $R_2$ is larger than a radius $R_1$ described later.

The first flange portion 304A of the intermediate member 300 can include an engagement portion 304a on a surface that faces the third seat 434. The engagement portion 304a can have a substantially inverted S-shaped cross section in conformity with the engagement portion 434a of the third seat 434 in order to abut against and support the third seat 434 from the circumferentially outer side. The engagement portion 304a can include a contact surface (first contact surface) 304$a_1$ spaced away from the fulcrum 434b by the radius (first radius) $R_1$ and having a cross section extending in an arc shape. The radius $R_1$ is smaller than the above radius $R_2$. In a preferred example, the radius $R_1$ is slightly smaller than the above radius $R_2$ (i.e., the radius $R_2$ is slightly larger than the radius $R_1$ to the extent that the third seat 434 can rotate, in other words, the radius $R_1$ and the radius $R_2$ are substantially the same).

In the example shown in FIG. 4, the fulcrum 434*b* is located on the radially outer side of the second contact surface 434*a*$_1$. That is, the distance between the second contact surface 434*a*$_1$ and the rotation center of the damper device 10 is smaller than the distance between the fulcrum 434*b* and the rotation center of the damper device 10.

With this configuration, the third seat 434 can rotate counterclockwise on the drawing sheet about the fulcrum 434*b* against the second elastic body 420 by receiving a centrifugal force, and then rotate clockwise on the drawing sheet about the fulcrum 434*b* by being biased by the second elastic body 420. When rotating in this manner, the second contact surface 434*a*$_1$ of the third seat 434 can slide against the first contact surface 304*a*$_1$ of the engagement portion 304*a*. Therefore, when the third seat 434 rotates about the fulcrum 434*b*, the first contact surface 304*a*$_1$ and the second contact surface 434*a*$_1$ that have substantially the same radius of curvature abut against (come into contact with) and slide against each other. Thus, the third seat 434 can rotate with a stable behavior because the second contact surface 434*a*$_1$ is supported by the first contact surface 304*a*$_1$ over a larger area (rather than at a point). Since the second contact surface 434*a*$_1$ is supported by the first contact surface 304*a*$_1$ over a larger area (rather than at a point) in this manner, wear between the second contact surface 434*a*$_1$ and the first contact surface 304*a*$_1$ due to sliding can be reduced greatly. Further, the centrifugal force applied to the third seat 434 is securely received by the first contact surface 304*a*$_1$ via the second contact surface 434*a*$_1$. Accordingly, the third seat 434 can rotate with a stable behavior.

Figure 5A:
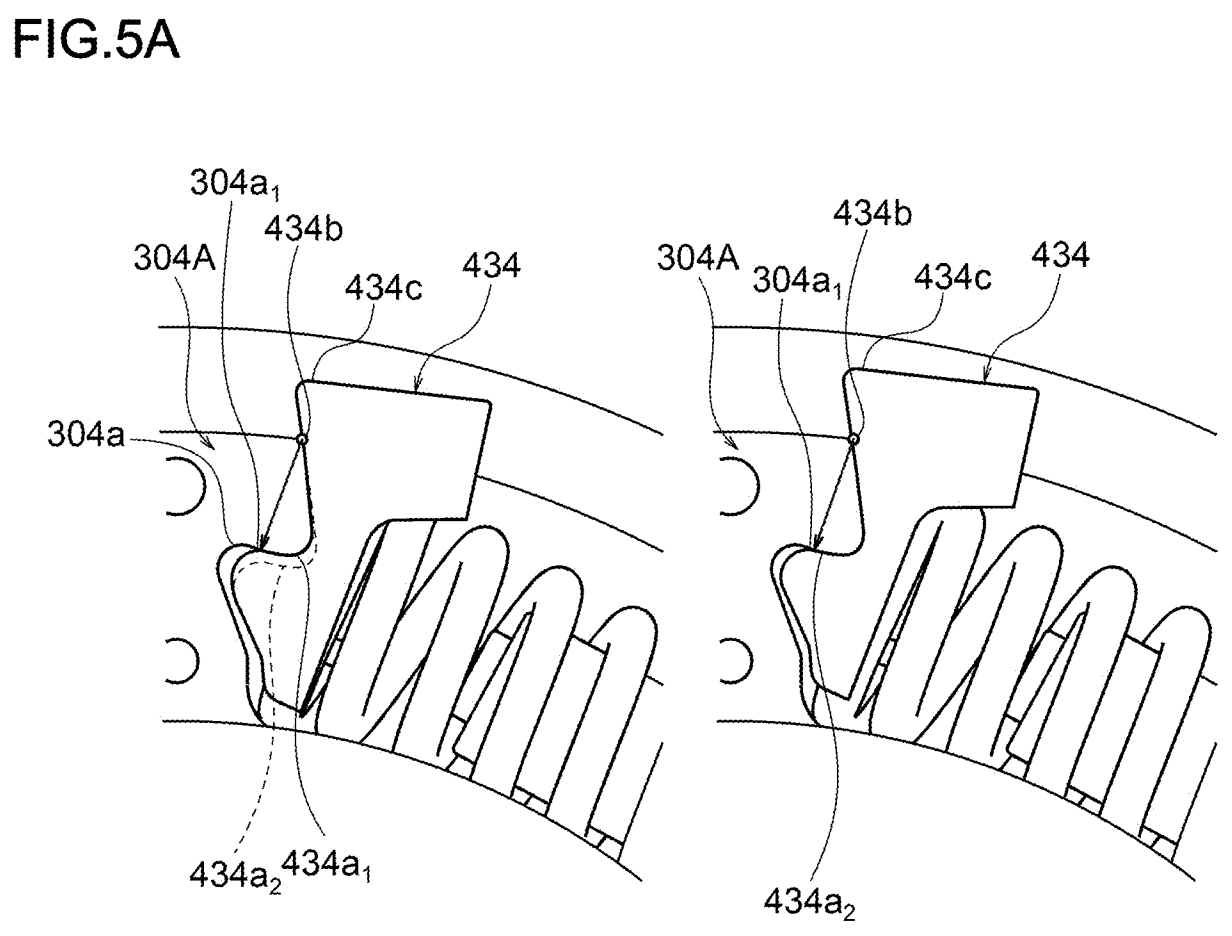

In a preferred example, the third seat 434 can have a configuration described below. FIG. 5A is an enlarged view schematically showing another example of the configuration of the portion including the third seat 434 in the damper device 10 shown in FIG. 2.

The left side of FIG. 5A shows the configuration of the portion including the third seat 434 etc. in an initial state without wear, and the right side of FIG. 5A shows the configuration of the portion including the third seat 434 etc. in a worn state.

Focusing on the left side of FIG. 5A, the third seat 434 is provided such that, in the initial state, an outer edge 434*c* protrudes radially outward from the fulcrum 434*b*. In other words, the third seat 434 is provided such that, in the initial state, the distance between the outer edge 434*c* and the rotation center of the damper device 10 is larger than the distance between the fulcrum 434*b* and the rotation center of the damper device 10.

Focusing on the right side of FIG. 5A, the second contact surface 434*a*$_1$ of the third seat 434 is worn. Therefore, a worn second contact surface 434*a*$_2$ can face the first contact surface 304*a*$_1$ of the intermediate member 300 (first flange portion 304A). Even in this state, the third seat 434 can rotate about the same fulcrum 434*b* as in the state shown on the left side of FIG. 5A. Therefore, the second contact surface 434*a*$_2$ of the third seat 434 can slide against the first contact surface 304*a*$_1$ as in the state shown on the left side of FIG. 5A. Thus, when the third seat 434 rotates about the fulcrum 434*b*, the third seat 434 can still rotate with a stable behavior because the second contact surface 434*a*$_2$ is supported by the first contact surface 304*a*$_1$ over a larger area (rather than at a point).

Figure 5B:
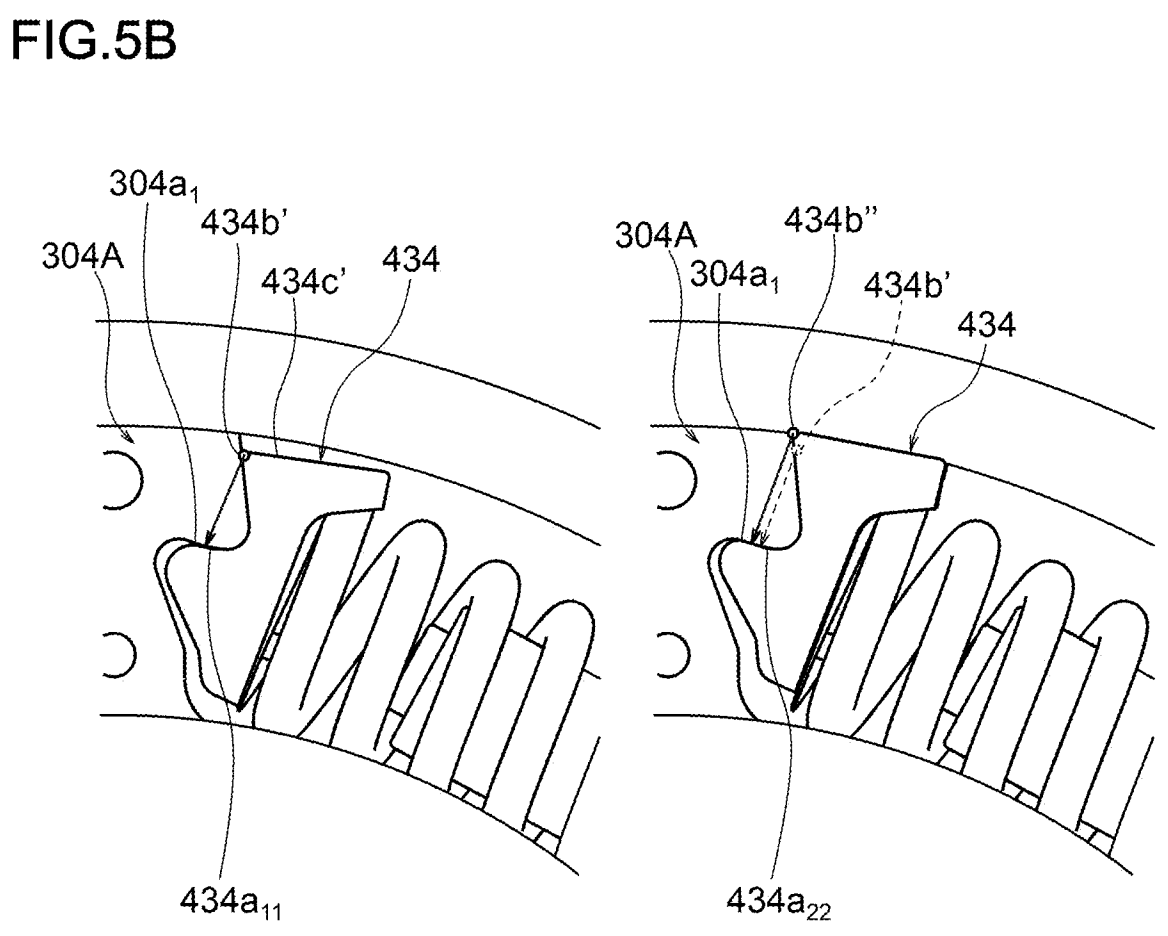

Reference will be made to FIG. 5B in order to more clearly describe the effect of the configuration shown in FIG. 5A. FIG. 5B is an enlarged view schematically showing still another example of the configuration of the portion including the third seat 434 in the damper device 10 shown in FIG. 2.

The left side of FIG. 5B shows the configuration of the portion including the third seat 434 etc. in an initial state without wear, and the right side of FIG. 5B shows the configuration of the portion including the third seat 434 etc. in a worn state.

Focusing on the left side of FIG. 5B, the third seat 434 is not provided such that, in the initial state, an outer edge 434*c*' protrudes radially outward from a fulcrum 434*b*', but is provided such that the outer edge 434*c*' is almost flush with the fulcrum 434*b*'. In other words, the third seat 434 is provided such that, in the initial state, the distance between the outer edge 434*c*' and the rotation center of the damper device 10 is almost equal to the distance between the fulcrum 434*b*' and the rotation center of the damper device 10. A second contact surface 434*a*$_{11}$ is a contact surface spaced away from the fulcrum 434*b*' by the radius (second radius) $R_2$ and having a cross section extending in an arc shape. The first contact surface 304*a*$_1$ is a contact surface spaced away from the fulcrum 434*b*' by the radius (first radius) $R_1$ and having a cross section extending in an arc shape.

Focusing on the right side of FIG. 5B, the second contact surface 434*a*$_{11}$ of the third seat 434 is worn. Therefore, a worn second contact surface 434*a*$_{22}$ faces the first contact surface 304*a*$_1$ of the intermediate member 300 (first flange portion 304A). In this state, the third seat 434 rotates not about the fulcrum 434*b*' as in the state shown on the left side of FIG. 5B, but about a different fulcrum 434*b*''. As a result, the second contact surface 434*a*$_{22}$ is not the contact surface spaced away from the fulcrum 434*b*'' by the radius (second radius) $R_2$ and having the cross section extending in the arc shape. Further, the first contact surface 304*a*$_1$ is not the contact surface spaced away from the fulcrum 434*b*'' by the radius (first radius) $R_1$ and having the cross section extending in the arc shape. Therefore, when the third seat 434 rotates about the fulcrum 434*b*'', it is difficult to smoothly slide the second contact surface 434*a*$_{22}$ against the first contact surface 304*a*$_1$.

As described above, the third seat 434 that adopts the configuration shown in FIG. 5A can still rotate with a stable behavior even after the second contact surface is worn compared to the third seat 434 that adopts the configuration shown in FIG. 5B.

Figure 6:
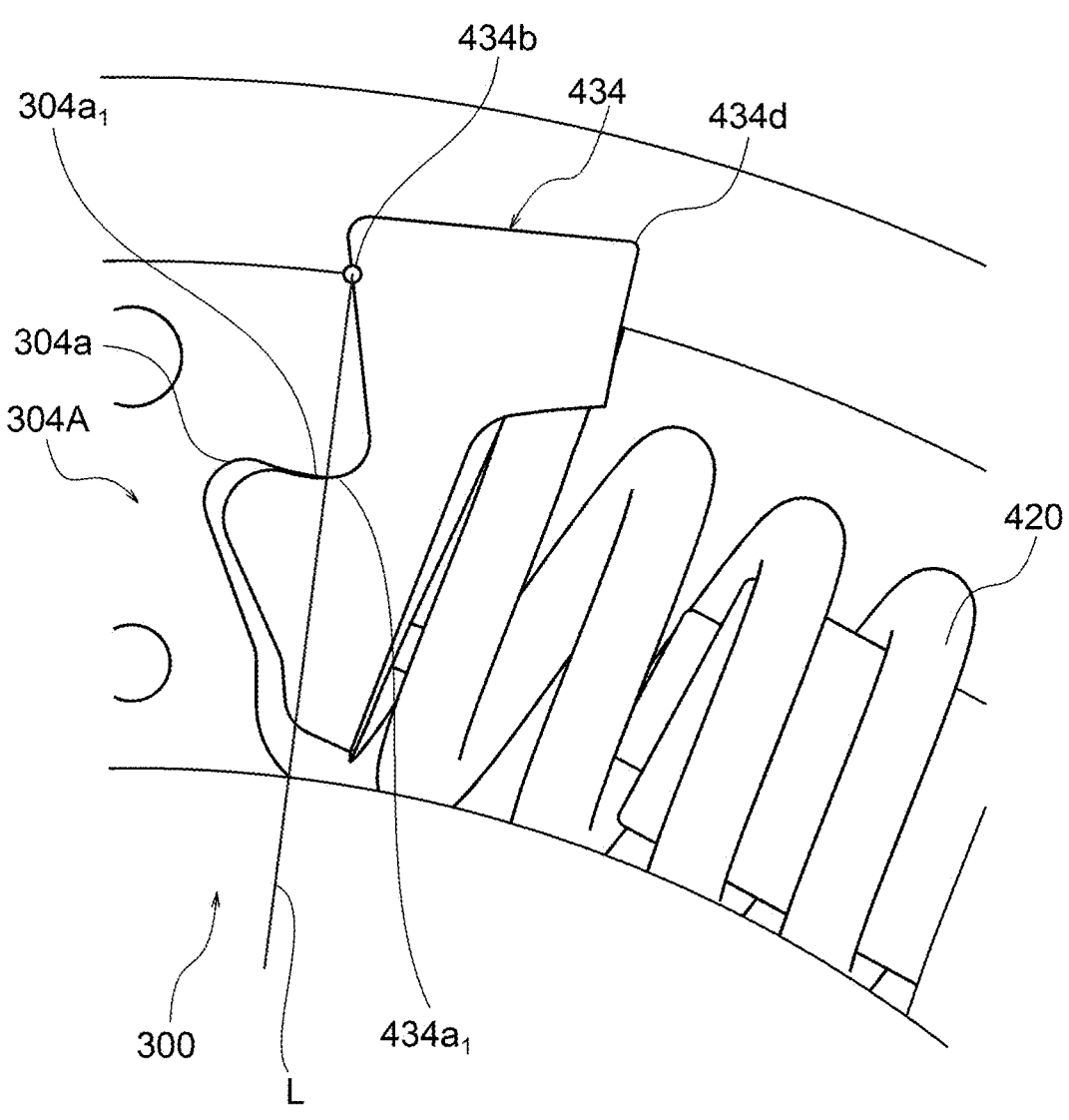
FIG. 6 is an enlarged view schematically showing still another example of the configuration of the portion including the third seat 434 in the damper device 10 shown in FIG. 2.

In a preferred example, the third seat 434 can have a configuration described below. FIG. 6 is an enlarged view schematically showing still another example of the configuration of the portion including the third seat 434 in the damper device 10 shown in FIG. 2.

FIG. 6 shows that the third seat 434 is in a position (first position) eventually reached by continuing to rotate in a first rotation direction (clockwise in this case) about the fulcrum 434*b*, that is, the third seat 434 is in a position (first position) where it is located by being biased by the second elastic body 420 without resisting the second elastic body 420.

When the third seat 434 continues to rotate in a second rotation direction (counterclockwise in this case) about the fulcrum 434*b* against the second elastic body 420 by receiving a centrifugal force, an outer edge 434*d* of the third seat 434 that is positioned farthest from the fulcrum 434*b* abuts against a wall surface surrounding the housing area 102A in the disc plate 100, and the third seat 434 can no longer continue to rotate any further. In this manner, the third seat 434 eventually reaches a position (second position) by continuing to rotate in the second rotation direction opposite to the first rotation direction.

In a preferred example, the second contact surface $434a_1$ and the first contact surface $304a_1$ may be provided such that, while the third seat 434 rotates between the first position and the second position, the second contact surface $434a_1$ always intersects a straight line L connecting the fulcrum 434b and the rotation center of the damper device 10. Therefore, the second contact surface $434a_1$ intersects the straight line L (and furthermore the first contact surface $304a_1$ that faces the second contact surface $434a_1$ also intersects the straight line L) while the third seat 434 is between the first position and the second position (i.e., always). That is, the second contact surface $434a_1$ and the first contact surface $304a_1$ are always present in an extension direction of the straight line L that is the direction in which the centrifugal force is applied. Thus, the centrifugal force applied to the third seat 434 is always borne by the first contact surface $304a_1$ via the second contact surface $434a_1$. Accordingly, the third seat 434 can rotate with a more stable behavior.

While the description has been given above focusing on the third seat 434, the various configuration examples of the third seat 434 can similarly be applied to the first seat 430 (see FIG. 2) having the symmetrical shape with respect to the first flange portion 304A. In this case, the first flange portion 304A can also include, on a surface that faces the first seat 430, an engagement portion similar to the engagement portion 304a (configuration described above with reference to FIGS. 4 to 6) included in the surface that faces the third seat 434. The engagement portion that supports the first seat 430 and the engagement portion 304a that supports the third seat 434 can have symmetrical shapes. Thus, the first seat 430 can rotate clockwise about the fulcrum by receiving the centrifugal force, and rotate counterclockwise about the fulcrum by being biased by the first elastic body 410.

4. Configuration and Operation of Second Seat 432

In a first example, as best shown in FIG. 2, the second seat 432 may have a substantially L-shaped cross section as a whole. With this shape, as described above, the second seat 432 can abut against the other end 414 of the first elastic body 410 and support the other end 414 from the circumferentially outer side and the radially outer side. The second seat 432 can further include, on the side opposite to the other end 414 of the first elastic body 410, the engagement portion 432a that engages with the first end face $104A_1$ of the disc plate 100 and is supported by the first end face $104A_1$. Although illustration is omitted in FIG. 2, the engagement portion 432a may also be supported by the cutout $206A_1$ (see FIG. 3) of the hub 200.

In a second example, the second seat 432 may have the same configuration as that of the third seat 434 described above with reference to FIGS. 4 to 6. When the second seat 432 has such a configuration, the first end face $104A_1$ of the disc plate 100 and the cutout $206A_1$ of the hub 200 that support the second seat 432 can similarly have the above configuration of the first flange portion 304A to support the third seat 434 (the configuration described above with reference to FIGS. 4 to 6). In this case, the second seat 432 can rotate counterclockwise about the fulcrum by receiving the centrifugal force, and rotate clockwise about the fulcrum by being biased by the first elastic body 410. Thus, the second seat 432 can rotate with a stable behavior similarly to the above third seat 434.

5. Configuration and Operation of Fourth Seat 436

In a first example, as best shown in FIG. 2, the fourth seat 436 may have a substantially L-shaped cross section as a whole. With this shape, as described above, the fourth seat 436 can abut against the other end 424 of the second elastic body 420 and support the other end 424 from the circumferentially outer side and the radially outer side. The fourth seat 436 can further include, on the side opposite to the other end 424 of the second elastic body 420, the engagement portion 436a that engages with the second end face $104A_2$ of the disc plate 100 and is supported by the second end face $104A_2$. Although illustration is omitted in FIG. 2, the engagement portion 436a may also be supported by the cutout $206C_2$ (see FIG. 3) of the hub 200.

In a second example, the fourth seat 436 may have the same configuration as that of the first seat 430 that may have the configuration symmetrical to that of the third seat 434 described above with reference to FIGS. 4 to 6. When the fourth seat 436 has such a configuration, the second end face $104A_2$ of the disc plate 100 and the cutout $206C_2$ of the hub 200 that support the fourth seat 436 can similarly have the above configuration of the first flange portion 304A to support the first seat 430 (the configuration described above with reference to FIGS. 4 to 6). In this case, the fourth seat 436 can rotate clockwise about the fulcrum by receiving the centrifugal force, and rotate counterclockwise about the fulcrum by being biased by the second elastic body 420. Thus, the fourth seat 436 can rotate with a stable behavior similarly to the third seat 434, the first seat 430, and the second seat 432 described above.

For the sake of convenience, the one elastic mechanism unit 400 housed in the housing area 102A and the constituent elements related thereto have been described above with reference to FIGS. 4 to 6. However, such description may similarly be applied to the one elastic mechanism unit 400 housed in the housing area 102B (housing area 102C) and the constituent elements related thereto.

6. Modifications

Referring to the drawings, the various embodiments described above have illustrated in detail the feature that a certain seat rotates about the fulcrum that is a point at which the seat abuts against a mating member that supports the seat, and the second contact surface spaced away from the fulcrum by the second radius larger than the first radius and having the cross section extending in the arc shape slides against the first contact surface of the mating member spaced away from the fulcrum by the first radius and having the cross section extending in the arc shape.

This feature is applicable to at least one target seat (and the mating member that supports the target seat) out of the first seat 430, the second seat 432, the third seat 434, and the fourth seat 436 disposed in one housing area (e.g., the housing area 102A). Each seat other than the target seat may have any configuration, for example, a configuration similar to that of the second seat 432 or the fourth seat 436 shown in FIG. 2 or a configuration similar to that of the seat disclosed in Patent Document 1.

When the at least one target seat includes the first seat 430, the mating member that supports the first seat 430 is the common support portion (first flange portion 304A) of the intermediate member 300.

When the at least one target seat includes the second seat 432, the mating member that supports the second seat 432 is the first end face $104A_1$ of the first rotator (disc plate 100) and/or the first support portion (cutout $206A_1$) of the second rotator (hub 200). When the at least one target seat includes the third seat 434, the mating member that supports the third seat 434 is the common support portion (first flange portion 304A) of the intermediate member 300.

When the at least one target seat includes the fourth seat 436, the mating member that supports the fourth seat 436 is the second end face 104A₂ of the first rotator (disc plate 100) and/or the second support portion (206C₂) of the second rotator (hub 200).

As easily understood by persons skilled in the art and having the benefit of the present disclosure, the various examples described above may appropriately be combined with each other in various patterns unless contradiction occurs.

7. Various Aspects

A damper device according to a first aspect can adopt a configuration in which "the damper device includes: a first rotator that includes a housing area extending in a circumferential direction and is configured to rotate about a rotation axis; an intermediate member that includes a common support portion housed in the housing area and is provided so as to be rotatable about the rotation axis relative to the first rotator; a first seat housed in the housing area and supported by the common support portion; a second seat housed in the housing area and supported by a first end face surrounding one end of the housing area; a first elastic body interposed between the first seat and the second seat; a third seat housed in the housing area and supported by the common support portion, the third seat being disposed such that the common support portion is interposed between the first seat and the third seat; a fourth seat housed in the housing area and supported by a second end face surrounding the other end of the housing area; a second elastic body interposed between the third seat and the fourth seat; and a second rotator that includes a first support portion that supports the second seat and a second support portion that supports the fourth seat, and is provided so as to be rotatable about the rotation axis relative to the first rotator and the intermediate member, in which at least one target seat out of the first seat, the second seat, the third seat, and the fourth seat is configured to rotate about a fulcrum that is a point at which the at least one target seat abuts against a mating member that supports the at least one target seat so that a second contact surface spaced away from the fulcrum by a second radius larger than a first radius and having a cross section extending in an arc shape slides against a first contact surface of the mating member spaced away from the fulcrum by the first radius and having a cross section extending in an arc shape."

With this configuration, the target seat can rotate in the first rotation direction about the fulcrum against the elastic body by receiving a centrifugal force, and then rotate in the second rotation direction about the fulcrum by being biased by the elastic body. When rotating in this manner, the second contact surface of the target seat can slide against the first contact surface. Therefore, when the target seat rotates about the fulcrum, the first contact surface and the second contact surface that have substantially the same radius of curvature abut against (come into contact with) and slide against each other. Thus, the target seat can rotate with a stable behavior because the second contact surface is supported by the first contact surface over a larger area (rather than at a point). Since the second contact surface is supported by the first contact surface over a larger area (rather than at a point) in this manner, wear between the second contact surface and the first contact surface due to sliding can be reduced greatly. Further, the centrifugal force applied to the target seat is securely received by the first contact surface via the second contact surface. Accordingly, the target seat can rotate with a stable behavior.

A damper device according to a second aspect can adopt a configuration in which "when the at least one target seat includes the first seat, the mating member that supports the first seat is the common support portion of the intermediate member, when the at least one target seat includes the second seat, the mating member that supports the second seat is the first end face of the first rotator and/or the first support portion of the second rotator, when the at least one target seat includes the third seat, the mating member that supports the third seat is the common support portion of the intermediate member, and when the at least one target seat includes the fourth seat, the mating member that supports the fourth seat is the second end face of the first rotator and/or the second support portion of the second rotator."

With this configuration, the at least one seat housed in the housing area can rotate with a stable behavior while reducing the wear between the seat and the mating member for the seat due to sliding between the seat and the mating member.

A damper device according to a third aspect can adopt a configuration in which "a distance between the second contact surface and a rotation center of the damper device is smaller than a distance between the fulcrum and the rotation center."

In this configuration, the fulcrum is positioned on the radially outer side of the second contact surface. Therefore, the target seat can rotate about the fulcrum and move radially outward by receiving the centrifugal force.

A damper device according to a fourth aspect can adopt a configuration in which "a distance between an outer edge of the at least one target seat and a rotation center of the damper device is larger than a distance between the fulcrum and the rotation center."

With this configuration, the target seat can still rotate with a stable behavior even after the second contact surface is worn.

A damper device according to a fifth aspect can adopt a configuration in which "the second contact surface intersects a straight line connecting the fulcrum and a rotation center of the damper device while the at least one target seat rotates about the fulcrum between a first position to be eventually reached by continuing to rotate in a first rotation direction and a second position to be eventually reached by continuing to rotate in a second rotation direction opposite to the first rotation direction."

With this configuration, the centrifugal force applied to the target seat is always borne by the first contact surface via the second contact surface. Accordingly, the target seat can rotate with a more stable behavior.

This application is based on Japanese Patent Application No. 2022-107532 filed on Jul. 4, 2022 with the title "Damper Device," and benefits from the priority of this Japanese patent application. The entire contents of this Japanese patent application are incorporated herein by reference.

DESCRIPTION OF THE REFERENCE NUMERALS

10 damper device
O rotation axis
L straight line
100 disc plate
100A first disc plate
100B second disc plate
102, 102A, 102B, 102C housing area $104A_1$, $104B_1$, $106A_1$, $106B_1$, $108A_1$, $108B_1$ first end face
$104A_2$, $104B_2$, $106A_2$, $106B_2$, $108A_2$, $108B_2$ second end face
200 hub
206, 206A, 206B, 206C flange
$206A_1$, $206A_2$, $206B_1$, $206B_2$, $206C_1$, $206C_2$ cutout
300 intermediate member
304 flange portion
304A first flange portion (common support portion)
304B second flange portion (common support portion)
304C third flange portion (common support portion)
304a engagement portion
$304a_1$ contact surface (first contact surface)
$R_1$ radius (first radius)
400 elastic mechanism unit
410 first elastic body
420 third elastic body
430 first seat
434a engagement portion
$434a_1$, $434a_2$ second contact surface
$R_2$ radius (second radius)
434b fulcrum
434c, 434d outer edge
432 second seat
434 third seat
436 fourth seat

The invention claimed is:

1. A damper device comprising:
a first rotator that includes a housing area extending in a circumferential direction and is configured to rotate about a rotation axis;
an intermediate member that includes a common support portion housed in the housing area and is provided so as to be rotatable about the rotation axis relative to the first rotator;
a first seat housed in the housing area and supported by the common support portion;
a second seat housed in the housing area and supported by a first end face surrounding one end of the housing area;
a first elastic body interposed between the first seat and the second seat;
a third seat housed in the housing area and supported by the common support portion, the third seat being disposed such that the common support portion is interposed between the first seat and the third seat;
a fourth seat housed in the housing area and supported by a second end face surrounding the other end of the housing area;
a second elastic body interposed between the third seat and the fourth seat; and
a second rotator that includes a first support portion that supports the second seat and a second support portion that supports the fourth seat, and is provided so as to be rotatable about the rotation axis relative to the first rotator and the intermediate member, wherein at least one target seat out of the first seat, the second seat, the third seat, and the fourth seat is configured to rotate about a fulcrum that is a point at which the at least one target seat abuts against a mating member that supports the at least one target seat so that a second contact surface of the at least one target seat is spaced away from the fulcrum by a second radius larger than a first radius and having a cross section extending in an arc shape slides against a first contact surface of the mating member spaced away from the fulcrum by the first radius and having a cross section extending in an arc shape.

2. The damper device according to claim 1, wherein
when the at least one target seat includes the first seat, the mating member that supports the first seat is the common support portion of the intermediate member,
when the at least one target seat includes the second seat, the mating member that supports the second seat is the first end face of the first rotator and/or the first support portion of the second rotator,
when the at least one target seat includes the third seat, the mating member that supports the third seat is the common support portion of the intermediate member, and
when the at least one target seat includes the fourth seat, the mating member that supports the fourth seat is the second end face of the first rotator and/or the second support portion of the second rotator.

3. The damper device according to claim 2, wherein a distance between the second contact surface and a rotation center of the damper device is smaller than a distance between the fulcrum and the rotation center.

4. The damper device according to claim 2, wherein a distance between an outer edge of the at least one target seat and a rotation center of the damper device is larger than a distance between the fulcrum and the rotation center.

5. The damper device according to claim 2, wherein the second contact surface intersects a straight line connecting the fulcrum and a rotation center of the damper device while the at least one target seat rotates about the fulcrum between a first position to be eventually reached by continuing to rotate in a first rotation direction and a second position to be eventually reached by continuing to rotate in a second rotation direction opposite to the first rotation direction.

6. The damper device according to claim 1, wherein a distance between the second contact surface and a rotation center of the damper device is smaller than a distance between the fulcrum and the rotation center.

7. The damper device according to claim 1, wherein a distance between an outer edge of the at least one target seat and a rotation center of the damper device is larger than a distance between the fulcrum and the rotation center.

8. The damper device according to claim 1, wherein the second contact surface intersects a straight line connecting the fulcrum and a rotation center of the damper device while the at least one target seat rotates about the fulcrum between a first position to be eventually reached by continuing to rotate in a first rotation direction and a second position to be eventually reached by continuing to rotate in a second rotation direction opposite to the first rotation direction.

* * * * *